May 19, 1925.  1,538,482
F. A. GLASS
PROCESS OF PRODUCING HARD, CELLULAR, CLAY PRODUCTS
Filed June 5, 1922
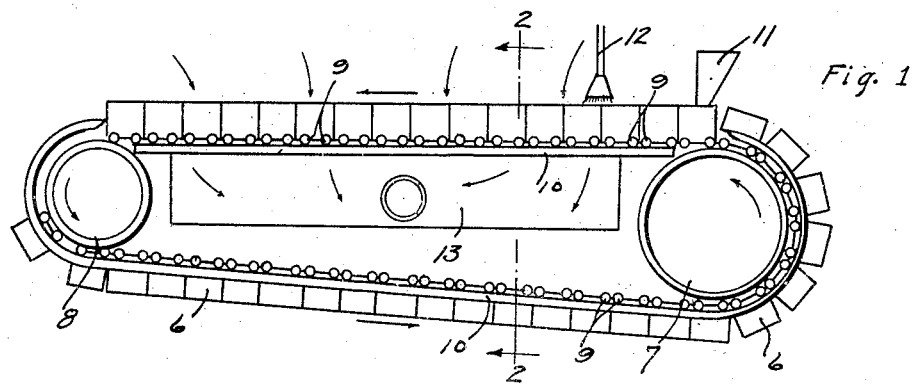
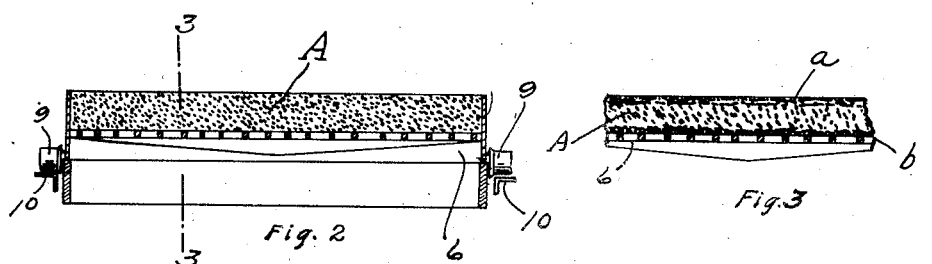
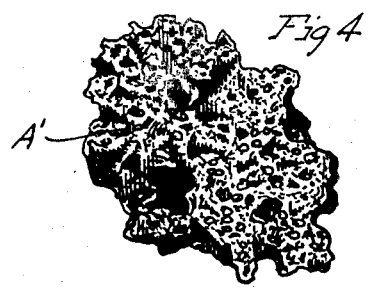
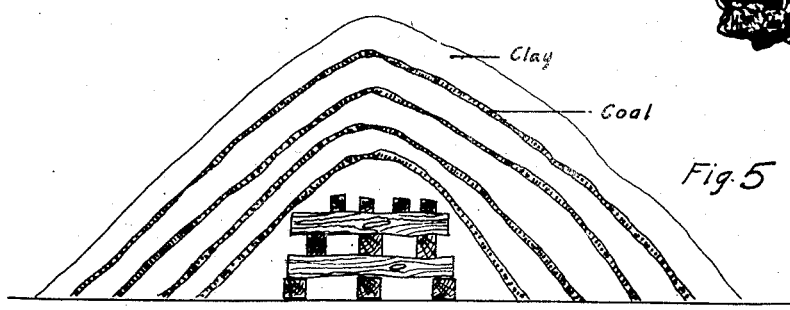
INVENTOR
Frank A. Glass
By
Attorneys Patented May 19, 1925.

1,538,482

UNITED STATES PATENT OFFICE.

FRANK A. GLASS, OF BRAINERD, MINNESOTA.

PROCESS OF PRODUCING HARD, CELLULAR, CLAY PRODUCTS.

Application filed June 5, 1922. Serial No. 566,051.

*To all whom it may concern:*

Be it known that I, FRANK A. GLASS, a citizen of the United States, residing at Brainerd, in the county of Crow Wing and State of Minnesota, have invented certain new and useful Improvements in Processes of Producing Hard, Cellular, Clay Products; and I do hereby declare the following to be a full, clear, and exact description of the invention, such as will enable others skilled in the art to which it appertains to make and use the same.

My invention relates to the art of producing hard, cellular, rock-like, clay products by subjecting clay to the action of intense heat. At present, there are other processes in vogue for burning clay, two of which will be described herein to illustrate more clearly wherein the process of my invention differs and is superior to other processes.

In what may be designated as the first process, the raw clay is fed into the upper end of a long rotary kiln in which is maintained an intense heat commonly produced by powdered, solid carbonaceous fuel projected through suitable burners into the kiln, and forming a cone of flame to which the clay under treatment is subjected and under the influence of which it is converted into a rock-like cellular mass. The apparatus employed in the process just outlined is costly in construction, operation and maintenance; is cumbersome and requires a fixed location. Moreover, it is wasteful of fuel, the escaping gases being of high temperature. Furthermore, the resulting product lacks uniformity of character and composition. The material undergoing treatment in a rotary kiln is subjected to a rolling, sliding, tumbling and agitating action, which tends to prevent the physical and chemical reactions it is desired to effect, and there is a tendency toward formation of masses having hard shells enclosing material incompletely dehydrated and fused. Moreover, these masses tend to increase in size, thus reducing the possibility of the interior particles becoming burned to the desired degree.

In what may be designated as the second process now in vogue for the burning of clay, a long row of wood is loosely piled, ignited and immediately covered with a layer of clay. This layer is then covered with a layer of fine coal and more clay is then, in turn, laid over this layer of fuel, and this alternate piling is continued to the desired extent. In this process, the reactions cannot be readily controlled because of the influence of weather conditions and lack of uniformity of spreading both the layers of clay and of fuel, nor does the clay burnt in this manner have a pronounced cellular structure. Moreover, many clays, such as sandy clays, cannot be satisfactorily fired in this way. Because of the lack of uniformity in the burnt product, such product has not been in demand to any considerable extent except as used for railway ballast. The proportion of fuel required is unduly high and, considering the inferior strength of the product, the cost of production is practically prohibitive, except in a few areas where the cost of fuel is exceedingly low.

My invention makes a radical departure from the above noted two older methods. In accordance with my improved process or method, I thoroughly commingle the clay with finely divided fuel, such as finely divided coal, and subject the clay, thus commingled, to heat by burning out the fuel that is commingled therewith. Because the fuel is thoroughly commingled with the clay and is then burned out while thus commingled, the combustion is produced internally of the mass and the heat is evenly distributed throughout the mass and utilized with but slight loss of heat—a very marked difference from any other process of burning clay. The fuel will be ignited at one external surface and, in the presence of combustion-supporting gas, usually air will be caused to burn progressively through the mass until all of the commingled combustible particles have been consumed. Moreover, the combustion can take place while the mass is at rest or in a state of quiescence, or state in which its particles maintain a static relation throughout the combustion. This feature, in itself, I have found to be of great importance, for it has been determined that the chemical and physical reactions, such as take place, for instance, within a rotary kiln, may be effected more readily and perfectly when the particles through which the reactions take place are in a state of quiescence.

I have thoroughly demonstrated in practice that, by this improved process, which contemplates the above noted two cardinal features, towit: quiescence of the porous mass and the commingling of the fuel with the mass, and burning out of the fuel from the mass by the direct action of combustion-supporting gas, a very superior burnt clay product may be produced. The even distribution of the heat and the progressive burning of the fuel throughout the body of the mass gives it an exceedingly even temperature throughout and insures a uniform product. The amount of heat may be varied by varying the amount of fuel and by varying the pressure of the combustion-supporting gas that is passed through the mass. The product that I have obtained by my improved process is hard, cellular, tough, fireproof, resistant to weathering, resistant to acids and alkalis; and is a nonconductor or low conductor of heat and sound. Under the action of the air forced through the burning mass, the combustion will take place progressively from one surface to the other of the mass, and as the fuel is burned out of the mass the relatively cold incoming air will, as is obvious, rapidly cool the same. This action is important because the work of cooling preserves the non-connecting cells which make the cooled mass cellular and very light, but substantially free from pores that pass through the mass.

By my improved process, clay substances, even when commingled with a large amount of sand, fine rock, and other foreign matter, can be readily vitrified and fused and thereby reduced to the desired form above indicated, whereas such materials do not correspond satisfactorily to treatment under either of the old methods above noted. The term "clay" is herein used in a broad sense to include slate and shale, schist derived therefrom, and earth substances of a clay nature consisting largely of elements whose oxides are known as silica, alumina, soda, potash, lime and magnesia. All carbonates contained in the raw product used in my process will be broken up and all organic or other combustible matter will be burned out of the mass of burnt clay.

I preferably carry out my improved process by first mixing the clay with finely divided fuel and thoroughly commingling them in a mechanical mixer, then breaking up the mixture into small masses generally under one-half of an inch in size, then spreading the material loosely in the form of a sheet on a grate, forcing a combustion-supporting gas through the mass, then igniting one surface of the mass, and subjecting the mass to heat resulting from the burning of the commingled fuel without agitating the mass while the fuel is being burnt. The resulting hard cellular sheet may be broken up into particles of any desired size, depending upon the character of the work into which it is to be incorporated. By suitably formed grates, it is also possible to burn clay by my improved process into the form of bricks or blocks, for building or other purposes.

In order to give a uniformly permeable character to the mixture of clay and fuel placed upon the grate, the mixture is sometimes moistened, although this treatment can be dispensed with when the clay has its customary natural dampness.

The clay product made in accordance with my invention may be put to a great many different uses. It is of exceptionally light weight in proportion to its strength. In general, the weight of a unit volume of the crushed product made by my improved process is one-third the weight of an equal volume of crushed rock, though the density and consequent unit volume weight can be widely varied. The product of my improved process, when tested on a standard rock-abrasion testing machine, compares favorably with similar tests on rock. It will be useful in making concrete for floors, partitions, roofs and the like; also it makes an ideal railway ballast and it is excellent, either alone or with other materials, for highway surfacing material.

In many parts of the country, clay is abundant while sand, gravel and rock are very scarce or entirely absent. My process of treating clay will be found especially serviceable in such localities. In addition to the uses above particularly emphasized, the product obtained by my process will be found especially serviceable in the preparing and building of hard durable highways. Moreover, carrying out of my invention does not require costly or elaborate plants and this fact makes it universely applicable for the production of hard clay products of the character noted wherever clay may be found available.

It will, of course, be understood that the process above described may be carried out in a great many different ways and that the apparatus illustrated in the drawings is only one of the ways in which it may be effected. The process may be carried out, for example, by the use of stationary grates or tilting grates and with either upward or downward draft produced by suction or by a pressure blast. For the purpose of more clearly explaining my process, I have made reference to uses to which the products of my invention can be used, but in so doing, I do not wish to be understood as limiting my invention in its useful application to the specific uses which are herein mentioned only for the purpose of illustration.

In the accompanying drawings, I have diagrammatically illustrated some of the parts of an apparatus by means of which my process may be economically carried out on a commercial scale.

In the said drawings, like characters indicate like parts throughout the several views.

Referring to the drawings:

Fig. 1 is a diagrammatic side elevation showing the apparatus;

Fig. 2 is a section on the line 2—2 of Fig. 1;

Fig. 3 is a fragmentary section on the line 3—3 of Fig. 2;

Fig. 4 is a perspective showing a chunk or piece of the completed product; and

Fig. 5 is a diagrammatic section illustrating what has been herein designated as old process number 2.

Referring first to Figs. 1, 2 and 3, the numeral 6 indicates an endless metallic conveyor belt that runs over suitable guiding and driving wheels 7 and 8. The links of said conveyor are shown as provided with anti-friction rolls 9 that run over horizontal rails 10. The numeral 11 indicates a hopper for supplying the commingled clay and fuel to the conveyor belt. The numeral 12 indicates a gas burner which starts the initial combustion of the fuel contained in the commingled mass at the upper surface thereof. The numeral 13 indicates a vacuum or suction box, over the open top of which the sheet of commingled clay and fuel will be carried. The commingled mass of clay and fuel is indicated by the character A. In Fig. 4, the character A' indicates a chunk or piece of the hard, porous, burnt clay product.

With the apparatus illustrated in Fig. 1, it is evident that the partial vacuum maintained in the box 13 will produce a downward suction of air through the commingled clay and fuel, thereby supporting the combustion until all of the fuel is burned out of the clay. Of course, the speed of the belt will be such that the result just stated will be accomplished.

In Fig. 3, the character $a$ indicates a layer of pulverized coal or fuel applied on the upper surface of the commingled clay and fuel body A, and $b$ indicates a layer of burnt clay or commingled burnt clay and fuel applied to the under surface of said body A. These layers $a$ and $b$, in some cases, will add to the completeness of the combustion, but in most instances will not be required.

What I claim is:

The process of producing from a clay substance a light weight hard cellular slag-like mass suitable for concrete aggregates, road beds, and the like, which consists in intimately and evenly commingling finely divided earth substances with finely divided fuel, in maintaining the commingled mass in a uniformly and freely permeable condition, in igniting the fuel of the mass at one surface thereof, and in concurrently maintaining three actions, towit: (a) progressively burning out the fuel of the mass by forcing a combustion-supporting gas therethrough, (b) maintaining the commingled mass in a state of quiescence, free from mechanical agitation, and (c) cooling that portion of the mass from which the fuel particles have been burned by forcing the combustion-supporting gas therethrough on its way to the burning zone.

In testimony whereof I affix my signature.

FRANK A. GLASS.